US007318149B2

(12) United States Patent
Cepulis et al.

(10) Patent No.: US 7,318,149 B2
(45) Date of Patent: Jan. 8, 2008

(54) SEMI-PERSISTENT RELOCATABLE RAM-BASED VIRTUAL FLOPPY DISK METHOD

(75) Inventors: Darren J. Cepulis, The Woodlands, TX (US); Steven R. Dupree, The Woodlands, TX (US); Curtis R. Jones, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 732 days.

(21) Appl. No.: 09/965,998

(22) Filed: Sep. 28, 2001

(65) Prior Publication Data

US 2003/0065913 A1 Apr. 3, 2003

(51) Int. Cl.
*G06F 9/24* (2006.01)
(52) U.S. Cl. ............................ 713/2; 713/1; 713/100
(58) Field of Classification Search ............... 713/1, 713/2, 100
See application file for complete search history.

(56) References Cited

U.S. PATENT DOCUMENTS

| | | | | | |
|---|---|---|---|---|---|
| 4,868,738 | A | * | 9/1989 | Kish et al. ................. | 710/26 |
| 5,546,585 | A | * | 8/1996 | Soga ......................... | 713/2 |
| 5,590,288 | A | * | 12/1996 | Castor et al. .............. | 709/201 |
| 5,974,250 | A | * | 10/1999 | Angelo et al. ............. | 713/100 |
| 6,106,396 | A | * | 8/2000 | Alcorn et al. ............. | 463/29 |
| 6,178,503 | B1 | * | 1/2001 | Madden et al. ........... | 713/2 |
| 6,192,471 | B1 | * | 2/2001 | Pearce et al. .............. | 713/2 |
| 6,310,608 | B1 | * | 10/2001 | Kaply et al. ............... | 345/168 |
| 6,324,627 | B1 | * | 11/2001 | Kricheff et al. ........... | 711/163 |
| 6,367,074 | B1 | * | 4/2002 | Bates et al. ............... | 711/170 |
| 6,385,721 | B1 | * | 5/2002 | Puckette .................... | 713/2 |
| 6,401,140 | B1 | * | 6/2002 | Wu ............................ | 710/10 |
| 6,463,537 | B1 | * | 10/2002 | Tello .......................... | 713/182 |
| 6,633,905 | B1 | * | 10/2003 | Anderson et al. ......... | 709/219 |
| 6,763,456 | B1 | * | 7/2004 | Agnihotri et al. ......... | 713/2 |
| 6,892,304 | B1 | * | 5/2005 | Galasso et al. ............ | 713/189 |
| 2002/0118272 | A1 | * | 8/2002 | Bruce-Smith ............. | 348/14.08 |

* cited by examiner

*Primary Examiner*—Rehana Perveen
*Assistant Examiner*—Tse Chen

(57) ABSTRACT

A method and related structure for providing operating system drivers during installation of the operating system, where those operating system drivers are provided by way of a virtual disk drive. Basic input/output system (BIOS) routines are adapted to support showing these operating system drivers as residing on a virtual disk drive within the system. The operating system drivers are stored in the unreserved ROM space of the computer. Further, multiple floppy images are stored in the ROM, and the BIOS is adapted to show only the floppy image appropriate for the operating system to be installed. The virtual drive contents may be those operating system drivers stored in the unreserved ROM, but also may be physically stored in RAM.

6 Claims, 3 Drawing Sheets

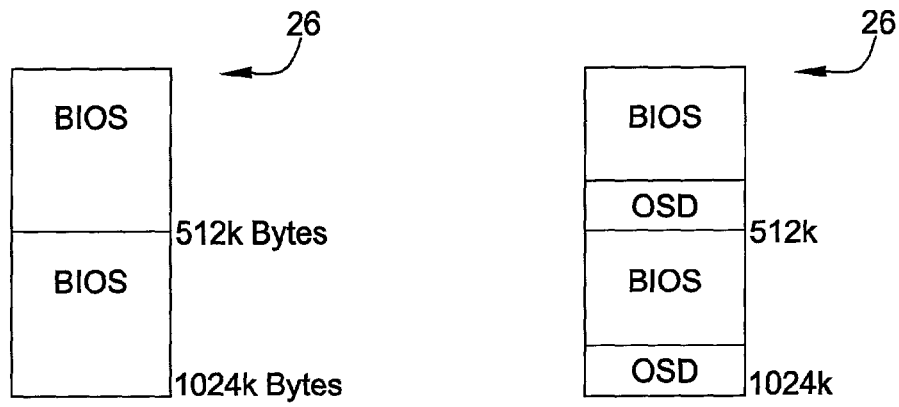
Figure 2
(Prior Art)
Figure 3
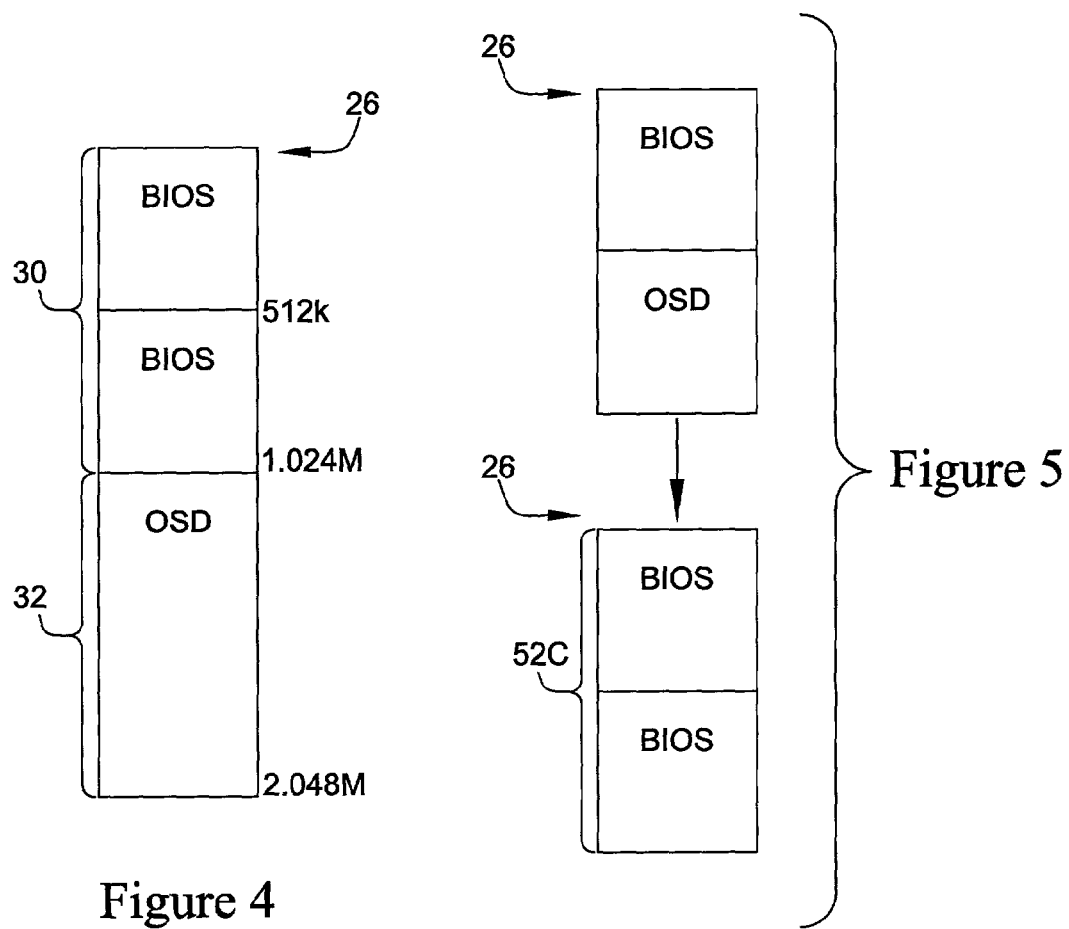
Figure 4
Figure 5

SEMI-PERSISTENT RELOCATABLE RAM-BASED VIRTUAL FLOPPY DISK METHOD

CROSS-REFERENCE TO RELATED APPLICATIONS

This application is related to application Ser. No. 09/966,064, entitled "Reserved ROM Space for Storage of Operating System Drivers," filed Sep. 28, 2001.

STATEMENT REGARDING FEDERALLY SPONSORED RESEARCH OR DEVELOPMENT

Not applicable.

BACKGROUND OF THE INVENTION

1. Field of the Invention

The various embodiments of the present invention relate to loading operating systems on computer or server systems. More particularly, the embodiments of the present invention are directed to ensuring the availability of operating system drivers during the operating system installation process.

2. Background of the Invention

One of the first functions that must be performed before a computer or server system is ready for operation is installation of the operating system. In early computer systems, this involved loading the Disk Operating System (DOS) to make available the then-familiar "C:>" prompt. For many years, DOS was the predominant operating system, even if another form of Graphical User Interface (GUI) was used. In recent years, however, software companies such as Microsoft, Inc. have created and are disseminating software that is not DOS-based. For example, Windows NT is an operating system and GUI in one package. Likewise, Windows 2000 is an operating system and GUI. These new systems communicate with hardware within the computer system by way of operating system or hardware drivers, rather than through traditional basic input/output system (BIOS) routines. During the process of installing these operating systems/user interfaces, it is required that proper drivers are installed for the hardware resident in the computer system.

Although several software manufacturers make operating systems, e.g., Linux, Novell, and Windows, the problem of installing correct operating system drivers is inherent in each package. In particular, software manufacturers typically bundle, along with the programs that make up their operating system, every operating system driver available as of the release date. However, there may be many months or even years between the release of the operating system and manufacture of the hardware devices within the computer system. Thus, it is inevitable the drivers are needed that are not included with the operating system. Installing an operating system driver other than one of the drivers included with the operating system software typically involves finding the appropriate driver, either on the internet or on a CD ROM included with the computer system. This driver is then typically copied or "punched-out" to a floppy drive (on a second computer as the CD ROM on the computer involved in the installation process is most likely not operational). The floppy disk drive including the required operating system driver is then inserted into the floppy drive unit of the affected computer at the appropriate time during the installation process.

While it is possible to install the correct operating system driver in this manner, it is seen from the above discussion that this is a complicated procedure. In the context of installing the operating system onto a server in a rack of servers, the situation gets more complex as each individual server may not have its own floppy drive; but rather, keyboard, video and floppy drive access may only be available across a communication bus.

Thus, what is needed in the art is a way to provide, during the operating system installation, operating system drivers without requiring the user to punch-out floppy disk drives or search the internet via other computer devices to find the necessary drivers.

BRIEF SUMMARY OF THE INVENTION

The problems noted above are solved in large part by a semi-persistent relocatable RAM-based virtual disk drive. In particular, operating system drivers are provided in ROM space. Those drivers are made available for copying during installation of the operating system by having the drivers appear to reside on a virtual floppy drive in the system.

In a second aspect of the preferred embodiments, multiple floppy images are preferably stored in the ROM space. Each of the floppy images preferably contains one or more operating system drivers for use with a particular type of operating system. Prior to installation of the operating system, the user preferably selects, by way of BIOS setup screens, which operating system is to be installed on a particular computer or server system. This selection process preferably sets an environment variable within a non-volatile memory in the computer system. BIOS routines, specifically interrupt 13h routines, preferably access the environment variables as an indication of which floppy image to provide in a virtual format such that operating system drivers may be copied at an appropriate time in the installation process.

In another aspect of the preferred embodiments, the virtual disk drive is provided at any location within the virtual address space. Thus, the actual contents of the virtual disk drive may reside on the ROM, which is mapped in the virtual address space, but also may reside at any other location within the virtual address space, for example within the RAM area of the virtual address space. In this way, a virtual floppy drive having semi-persistent qualities may have its contents placed in the RAM. Such a virtual disk drive contents would survive a warm boot procedure, such as that instituted by an interrupt 19h BIOS routine.

BRIEF DESCRIPTION OF THE DRAWINGS

For a detailed description of the preferred embodiments of the invention, reference will now be made to the accompanying drawings in which:

FIG. 2 shows, in block diagram form, the contents of a ROM of the prior art;

FIG. 3 shows, in block diagram form, the contents of a ROM of one of the embodiments of the present invention;

FIG. 4 shows, in block diagram form, the contents of a ROM of one embodiment of the present invention;

FIG. 5 shows, in block diagram form, the contents of a ROM of one embodiment of the invention, both before and after copying of the operating system drivers;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

Throughout the specification and claims, the term read only memory (ROM) refers to integrated circuit memory devices. If other types of read only memory devices are the focus of the discussion, those will be referred to directly, e.g., compact disk ROM (CDROM) and the like. Thus, the term ROM, unless specifically limited, may mean programmable read only memory (PROM), erasable programmable read only memory (EPROM), and the variants of EPROM such as ultra-violet erasable programmable read only memory (UVPROM) and electrically erasable programmable read only memory (EEPROM).

DETAILED DESCRIPTION OF THE PREFERRED EMBODIMENTS

Figure 1:
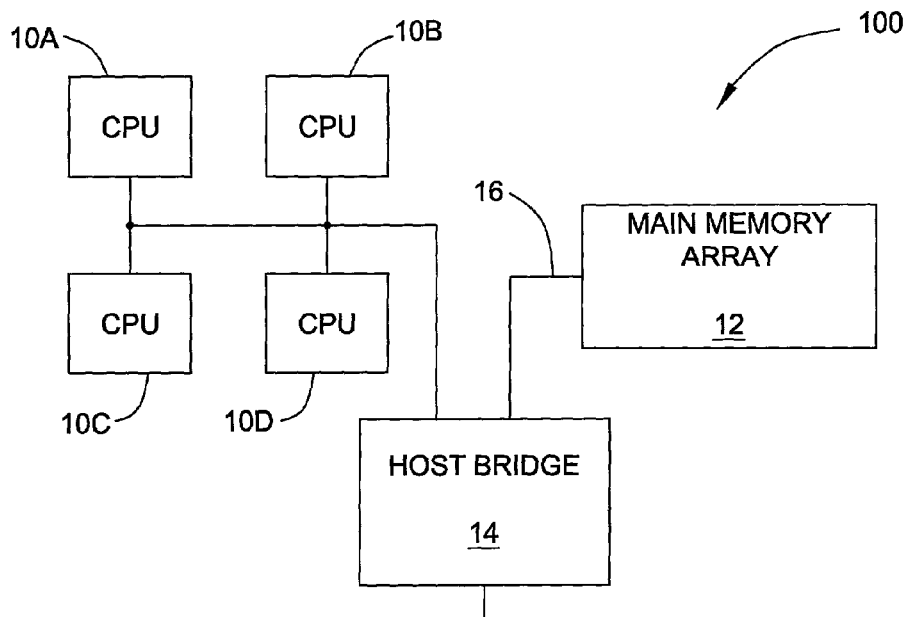
FIG. 1 shows a computer system of the preferred embodiment.
Figure 1:
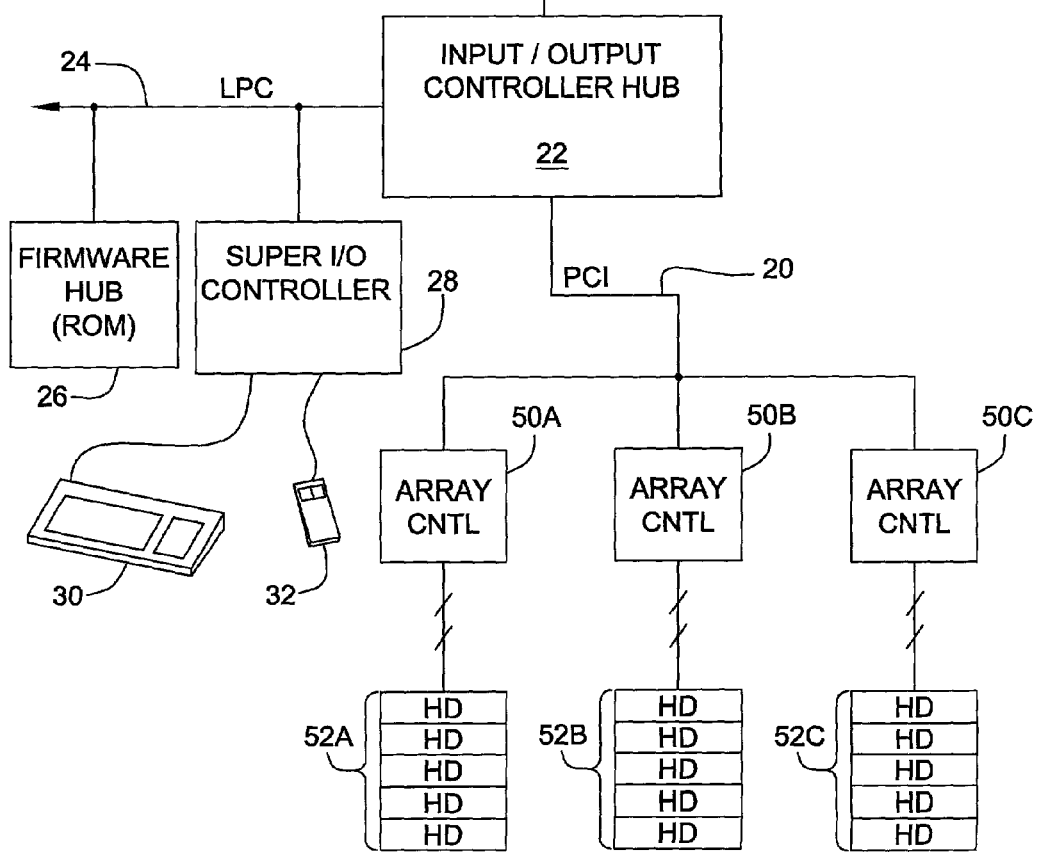

Referring now to FIG. 1, computer system 100 in accordance with the preferred embodiment comprises at least one CPU 10. Inasmuch as computer system 100 is preferably a server system, the computer system 100 may comprise multiple CPUs 10A, 10B, 10C, 10D arranged in a configuration where parallel computing may take place. The CPU array 10 couples to a main memory array 12 and a variety of other peripheral computer system components through an integrated host bridge logic device 14. The CPU array 10 may comprise, for example, a plurality of Pentium® III microprocessors. It should be understood, however, that computer system 100 could include other alternative types and numbers of microprocessors. Additionally, other architectures could be used if desired. Thus, the computer system may implement other bus configurations and bus bridges in addition to, or in place of, those shown in FIG. 1.

The main memory array 12 preferably couples to the host bridge logic 14 through a memory bus 16, and the host bridge logic 14 preferably includes a memory control unit (not shown) that controls transactions to the main memory 12 by asserting the necessary control signals during memory accesses. The main memory 12 functions as the working memory for the CPUs 10 and includes a memory device or array of memory devices in which program instructions and data are stored. The main memory array 12 may comprise any suitable type of memory such as Dynamic Random Access Memory (DRAM) or any of the various types of DRAM devices such as Synchronous DRAM (SDRAM), Extended Data Output DRAM (EDO DRAM), or Rambus™ DRAM (RDRAM).

In as much as computer system 100 is preferably a server system, in some embodiments, the computer system 100 does not include a dedicated display device. In the embodiments that do include a dedicated display device, such a computer system could be implemented by coupling a video driver card to the host bridge 14 by way of an Advanced Graphics Port bus or other suitable type of bus. Alternatively, the video driver card could couple to the primary expansion bus 18 or one of the secondary expansion buses, for example, the PCI bus 20. If the computer system had a dedicated display device, the video driver or graphic controller would couple to a display device. That display may comprise any suitable electronic display device upon which any image or text can be represented.

The computer system 100 preferably comprises a second bridge logic device 22 that bridges the primary expansion bus 18 to various secondary buses including a low pin count (LPC) bus 24 and a peripheral component interconnect (PCI) bus 20. In accordance with the preferred embodiment, the bridge device 36 is an Input/Output Controller Hub (ICH) manufactured by Intel Corporation. Although the ICH 22 of FIG. 1 is shown only to support the LPC bus 24 and the PCI bus 20, various other secondary buses may be supported by the ICH 22. In the preferred embodiment shown in FIG. 1, the primary expansion bus 18 comprises a Hub-link bus which is a proprietary bus of the Intel Corporation. However, computer system 100 is not limited to any particular type of primary expansion bus, and thus other suitable buses may be used.

Referring still to FIG. 1, a firmware hub 26 couples to the ICH 22 by way of the LPC bus 24. The firmware hub 26 preferably comprises Read Only Memory (ROM) which contains software programs executable by the CPU array 10. The software programs preferably include programs to implement basic input/output system (BIOS) commands, and instructions executed during and just after Power On Self Test (POST) procedures.

A Super Input/Output controller 28 couples to the ICH 22 and controls many system functions including interfacing with various input and output devices such as keyboard 30. The Super I/O controller 28 may further interface, for example, with a system pointing device such as a mouse 32, various serial ports (not shown) and floppy drives (not shown). The Super I/O controller is often referred to as "super" because of the many I/O functions it may perform.

Also shown in the computer system 100 of FIG. 1 are three array controllers 50A, 50B, 50C coupled to the ICH 22 by way of the PCI bus 20. Each array controller 50 couples to a plurality of hard drives 52A, 52B, 52C. Thus, the array controller 50 preferably performs data reads, data writes and other necessary data manipulation to implement a redundant array of independent devices (RAID) system. It will be understood that while FIG. 1 shows only three array controllers 50, computer system 100 may support any number of these controllers. It must be understood however that the invention is not limited to computer systems having multiple CPUs or implementing RAID systems; rather, the preferred embodiments apply equally to all types of computer systems.

The preferred embodiments of the present invention address how to provide operating system drivers during the operating system installation process. In particular, the preferred embodiments of the present invention provide necessary operating system drivers by placing or storing those drivers in the ROM or firmware hub 26. Preferably, operating system drivers may be copied from those versions resident in the system ROM 26 during the operating system installation procedure.

In computer systems requiring high availability and reliability, e.g., server systems, multiple copies of the BIOS firmware or programs may be stored in the system ROM 26. FIG. 2 shows a prior art technique for having multiple copies that simply involves burning two copies of the BIOS programs onto the ROM 26. In particular, FIG. 2 shows two copies of the BIOS, with the first copy occupying the first 512 kilobytes of the ROM, and the second copy occupying the second 512 kilobytes of the one megabyte ROM. A smaller ROM known as a "boot-block" ROM (not shown) that is responsible for selecting which of the multiple copies of the BIOS will be loaded during the POST procedure.

Placing operating system drivers in the ROM 26 may take many forms. FIG. 3 shows one embodiment in which the operating system drivers (labeled OSD in the drawing) are placed within each redundant section of the ROM 26. At the appropriate time during the operating system installation procedure, either or both of the drivers stored on the ROM 26 would be made available for copying and use by the operating system. A preferred embodiment for making those operating system drivers available is discussed more fully below.

Operating system drivers range in complexity, and therefore range in size, with some drivers approaching 100 kilobytes or more. In a situation where the drivers are large, the implementation shown in FIG. 3 would not be desirable inasmuch as the operating system drivers would occupy significant space in the ROM (especially given the duplication). Conversely, if the operating system drivers to be provided on the ROM 26 are relative small, the implementation exemplified in FIG. 3 may be acceptable.

Where the operating system drivers are large, or a number of drivers must be provided, the preferred embodiments provide for storing those operating system drivers in a non-redundant area of the ROM 26. FIG. 4 shows an implementation where a larger, preferably two megabyte, ROM is used. Preferably, the ROM is divided up into redundant 30 and non-redundant 32 space. In FIG. 4, the redundant space is shown to occupy the first one megabyte of the ROM 26, and the non-redundant space, containing the operating system drivers, is shown to occupy the second one megabyte. It must be understood, however, that division of the ROM 26 of FIG. 4 is only exemplary, and the storage space of the ROM 26 may be divided in any convenient way. Using the implementation exemplified in FIG. 4, a bootblock program stored on a boot-block ROM (not shown), selects one of the two BIOS firmware copies stored in the redundant area 30 of the ROM 26. Thereafter, and at the appropriate time during the operating system installation procedure, the operating system drivers located in the non-redundant area 32 of the ROM are made available.

In the exemplary implementation of storing operating system drivers on the ROM 26 as shown in FIG. 4, the size of the ROM 26 was increased from one megabyte to two megabytes, such that the duplicate copies of the BIOS and the operating system drivers could reside on a single ROM device. However, increasing the size of the ROM 26 also increases system cost. For this reason, some manufacturers may not want to spend the additional money to provide the larger ROMs, but still may want to provide redundant copies of the BIOS and also provide copies of the operating system drivers on the ROM.

FIG. 5 shows one possible implementation for providing both the redundant BIOS and the operating system drivers on the ROM. In particular, the upper ROM 26 is shown to have a single copy of the BIOS programs, as well as a copy of the operating system drivers. Preferably, the ROM 26 has this configuration as it leaves the factory and during the operating system installation procedure. The program stored in the boot block ROM (not shown) determines whether the ROM contents are BIOS programs or operating system drivers by use of signatures in the BIOS firmware that identify the programs. Preferably, once the operating system drivers have been provided during installation of the operating system, a utility program copies the BIOS, provided only in non-redundant fashion initially, to the second half of the ROM 26. By copying the BIOS over the operating system drivers, a redundant BIOS system is provided, as shown in the lower ROM 26 of FIG. 5. While this implementation provides both the redundant BIOS, after operating system installation, and also provides operating system drivers on the ROM, the operating system drivers are overwritten and thus will not be available if the operating system must be installed again.

Making the operating system drivers available has three aspects that may be used alone or in combination in the preferred embodiment: 1) providing the latest drivers for each major operating system; 2) making those drivers available to the user during installation of the operating system by use of a virtual disk drive; and 3) providing those operating system drivers in a virtual drive scheme with the system drivers residing in RAM.

As discussed in the Background section, there are many available operating systems for computers in the marketplace, e.g., Linux (manufactured by Red Hat Software), Novell (manufactured by Novell Incorporated), Windows 2000 (manufactured by Microsoft Inc.). For a particular piece of hardware in the system, e.g., an array controller 50 (FIG. 1), each operating system may require a different driver. This may be due in part to differences in protocols with regard to Interfacing with the operating system, but may also be caused merely by differences In file structures between operating systems. Stated otherwise, a driver for operating an array controller 50 in a Windows 2000 environment (FAT file system) may not be suitable for use In a Linux environment (2×72 file system). Thus, in the preferred embodiment, if drivers need to be included on the system ROM 26, preferably drivers for each of the major operating systems are provided. Considering that there may be an array of devices for which the latest operating system driver may be provided, the amount of space on the ROM 26 required to store each driver for each hardware system may become rather large. In this regard, the implementation shown in FIG. 4 for dividing the ROM 26 into a redundant 30 and non-redundant 32 portion is the preferred implementation.

Figure 6:
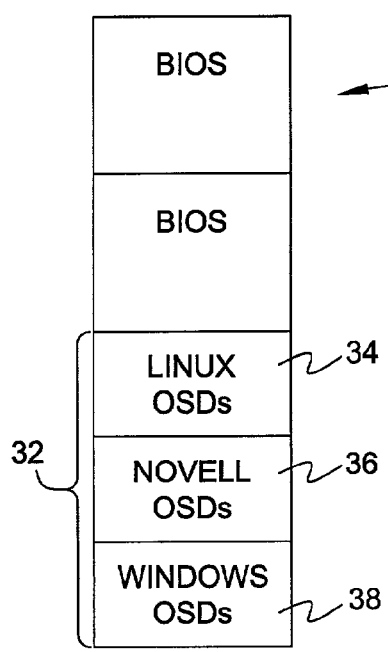
FIG. 6 shows, in block diagram form, the contents of a ROM of one embodiment of the invention having multiple floppy images contained thereon.

FIG. 6 exemplifies the situation where multiple sets of operating system drivers are provided. In particular, FIG. 6 shows that the non-redundant 32 space of the ROM 26 contains several sets of drivers, in the exemplary system, a set of Linux drivers 34, Novell drivers 36 and Windows drivers 38. It must be understood that providing these particular drivers is only exemplary, and any number of drivers for any number of operating systems may be provided and still be within the contemplation of this invention. Further, FIG. 6 implies that the operating system drivers occupy the entire non-redundant 32 space of the ROM 26; however, this need not necessarily be the case, and any or all of the non-redundant 32 space may be used to store the operating system drivers.

In the preferred embodiment described above, a set of operating system drivers (34, 36, 38 of FIG. 6), which may alternatively be referred to as floppy images, are provided in the ROM 26. These multiple sets of operating system drivers are provided to account for the fact that a manufacturer may not know at the time of building the computer system what operating system will be installed thereon. Since multiple sets of operating system drivers are preferably provided, there should be a method of providing the correct drivers for the particular operating system. In the preferred embodiments, making available the correct operating system drivers for the operating system is preferably accomplished by a BIOS setup parameter and a modification to the standard disk access routine known as Interrupt 13h.

In the preferred embodiment the BIOS setup routines are modified to contain a field where a user, when making an initial setup of the BIOS, selects which operating system is to be installed on the computer or server. It must be understood that this selection in the BIOS is not a part of the operating system installation procedure; but rather, is merely a mechanism to inform the BIOS which operating system is to be installed. Preferably, the BIOS uses this information to select an appropriate floppy image having a set of operating system drivers from the images stored in the non-redundant 32 space of the ROM 26. For example, if a user selects from the BIOS setup screen that Windows 2000 will be the operating system for the computer, the BIOS then makes available, in a manner described more fully below, the floppy image containing Windows operating system drivers 38 (see FIG. 6).

Drivers are made available to the user and to the operating system installation procedure by having them reside on a virtual floppy drive or virtual disk drive. More particular, in the preferred embodiment, the Interrupt 13h BIOS calls for performing disk drive activties are preferably implemented such that the operating system drivers (either all of them or just the appropriate drivers for The particular operating system) stored on the ROM 26 appear to reside on a disk drive. Because the files are not actually stored on a floppy disk, this is known as creating a virtual drive. As mentioned above, the user preferably selects in a BIOS setup screen which operating system is to be installed on the computer system, and based on that selection, preferably only the drivers appropriate for the selected operating system are made available in this virtual drive method.

More particularly still, in the preferred embodiment, selecting a particular operating system to be installed preferably sets an environment variable in a non-volatile memory. This non-volatile memory could be non-volatile RAM (NVRAM), or may be written directly to the ROM 26, which in the preferred embodiment is electrically erasable programmable read only memory (EEPROM) Regardless of the location of the environment variables, by selecting an operating system, the environment variables preferably point to a floppy image having operating system drivers appropriate for that operating system. During the installation process, before the operating system is installed, disk services are provided by the BIOS. Thus, during installation, the Interrupt 13h services preferably are adapted to show the appropriate operating system drivers, indicated by the environment variables, as residing on a disk drive. Thus, drivers needed for correct setup during the operating system installation process are then available as if they had been copied to a floppy and inserted in a disk drive in the system. Using the preferred embodiment alone, it is then possible to provide the operating system drivers during the operation system installation process by informing the installation program of the need to use drivers different than those provided with the operating system, and pointing that operating system software to the virtual drive. The installation program could also automatically search for and use drivers resident on virtual drives with little or no user input.

Figure 7:
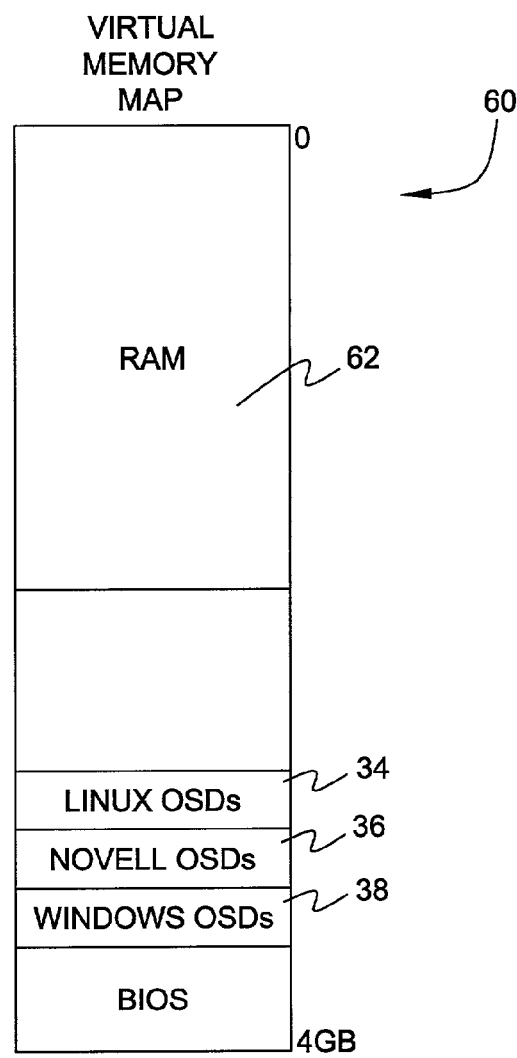
FIG. 7 shows a virtual memory map of the preferred embodiments.

Referring now to FIG. 7, there is shown an exemplary virtual address space or virtual memory map for the computer or server system of the preferred embodiment. As one of ordinary skill in the art is aware, the ROM 26 contents are typically mapped in the virtual address space to a location having addresses just below the four gigabyte addressable space. In this way, the system devices wishing to access the ROM contents need only know the addresses of those ROM contents in the virtual address space. As exemplified in FIG. 7, the virtual address space includes not only the floppy images having the operating system drivers 34, 36 and 38, but also includes all the addressable space for the random access memory (RAM), the RAM area. Thus, in the preferred embodiment, when the user selects the particular operating system to be installed in the BIOS setup screens, the BIOS preferably updates an environment variable which points, in the virtual address space, to the operating system drivers appropriate for that operating system to be installed. Sometime thereafter, when performing disk accesses using the BIOS subroutines, the installation process requests an operating system driver from a virtual drive. The Interrupt 13h services provide the operating system drivers available at the location indicated by the environment variables as if those drivers were provided on an actual floppy drive.

It is noted, however, that the mapping of the possible operating system drivers 34, 36 and 38 are within the same virtual address space as the random access memory (FIG. 7). In another aspect of the invention, information and data may be provided to the operating system by use of a virtual disk drive, where the contents of that virtual disk drive resides in the RAM area 62 portion of the virtual memory rather than one of the operating system drivers, again within the virtual address space. Data and programs placed in a virtual drive with its contents stored in RAM would be semi-persistent, meaning that the data would survive and be available after a warm boot, for example an warm boot initiated by an Interrupt 19h.

While creating a virtual disk drive resident in RAM and accessible through BIOS interrupts was developed in the context of providing operating system drivers during operating system installation procedures, any data or programs which need to be made available in a semi-persistent manner may be provided in this way, and still be within the contemplation of the invention.

The above discussion is meant to be illustrative of the principles and various embodiments of the present invention. Numerous variations and modifications will become apparent to those skilled In the art once the above disclosure is fully appreciated. For example, the preferred embodiments have been described with regard to placing the operating system drivers on the same ROM as the BIOS programs; however, the ROM provided in the computer system could be a ROM array comprising several individual ROM devices, and the operating system software could reside on any or all of the ROM devices, and still be within the contemplation of this invention. Further, providing operating system drivers in the manner described herein was developed in the context of server systems having multiple microprocessors and multiple hard drives implementing RAID systems; however, the preferred embodiments could also be applied to stand alone computer systems having only a single microprocessor and single hard drive. Further, the What claimed is:

1. A read only memory (ROM) device comprising:
a basic input output system (BIOS) program; and
hardware drivers;
wherein the BIOS program, when executed by a microprocessor, makes at least some of the hardware drivers available for copying by identifying the hardware drivers on the ROM as files on a virtual disk drive; and
wherein the BIOS program, when executed by a microprocessor, makes available on the virtual disk drive only the hardware drivers operable with an operating system to be installed.

2. The ROM device as defined in claim 1 wherein the hardware drivers further comprise:
a first set of hardware drivers for use with a first type operating system;
a second set of hardware drivers for use with a second type operating system; and
wherein the BIOS program makes only the first set of hardware drivers available during installation of the first type operating system, and wherein the BIOS program makes only the second set of hardware drivers available during installation of the second type operating system.

3. A computer system comprising:
a processor;
a main memory array coupled to the processor; and
a read only memory (ROM) coupled to the processor, wherein the ROM stores basic input output system (BIOS) programs and operating system drivers;
wherein the BIOS programs of the ROM implement a virtual disk drive by mapping at least some of the operating system drivers to virtual address space of the main memory array, the mapped operating system drivers operable in conjunction with an operating system identified during initial set up of the BIOS;
wherein during installation of an operating system on the computer at least one of the operating system drivers is copied from the virtual disk drive; and
wherein after installation of the operating system the operating system drivers are over written with a redundant copy of the BIOS.

4. The computer system as defined in claim 3 wherein the operating system drivers comprise a first set of operating system drivers for use a first operating system and a second set of operating system drivers for a second operating system, and wherein when the BIOS programs implement the virtual disk drive the BIOS programs configure the virtual disk drive to appear to store only the first set of operating system drivers if the first operating system is being installed.

5. A method comprising:
storing operating system drivers on a read only memory (ROM) within a computer system;
identifying an operating system to be installed on the computer system, the identifying during initial basic input output system (BIOS) set up;
invoking BIOS routines to make available on a virtual disk drive operating system drivers stored on the ROM; and
copying from the virtual disk drive only operating system drivers operable with the identified operating system.

6. The method as defined in claim 5 wherein invoking further comprises:
invoking interrupt 13h BIOS routines directed to the virtual disk drive; and
returning a file name for at least one of the operating system drivers by the interrupt 13h BIOS routines as if the operating system drivers resided on the virtual disk drive.

* * * * *

UNITED STATES PATENT AND TRADEMARK OFFICE
CERTIFICATE OF CORRECTION

| | | |
|---|---|---|
| PATENT NO. | : 7,318,149 B2 | Page 1 of 1 |
| APPLICATION NO. | : 09/965998 | |
| DATED | : January 8, 2008 | |
| INVENTOR(S) | : Darren J. Cepulis et al. | |

It is certified that error appears in the above-identified patent and that said Letters Patent is hereby corrected as shown below:

In column 10, line 7, in Claim 3, delete "over written" and insert -- overwritten --, therefor.

Signed and Sealed this

Tenth Day of June, 2008

JON W. DUDAS
*Director of the United States Patent and Trademark Office*